UNITED STATES PATENT OFFICE.

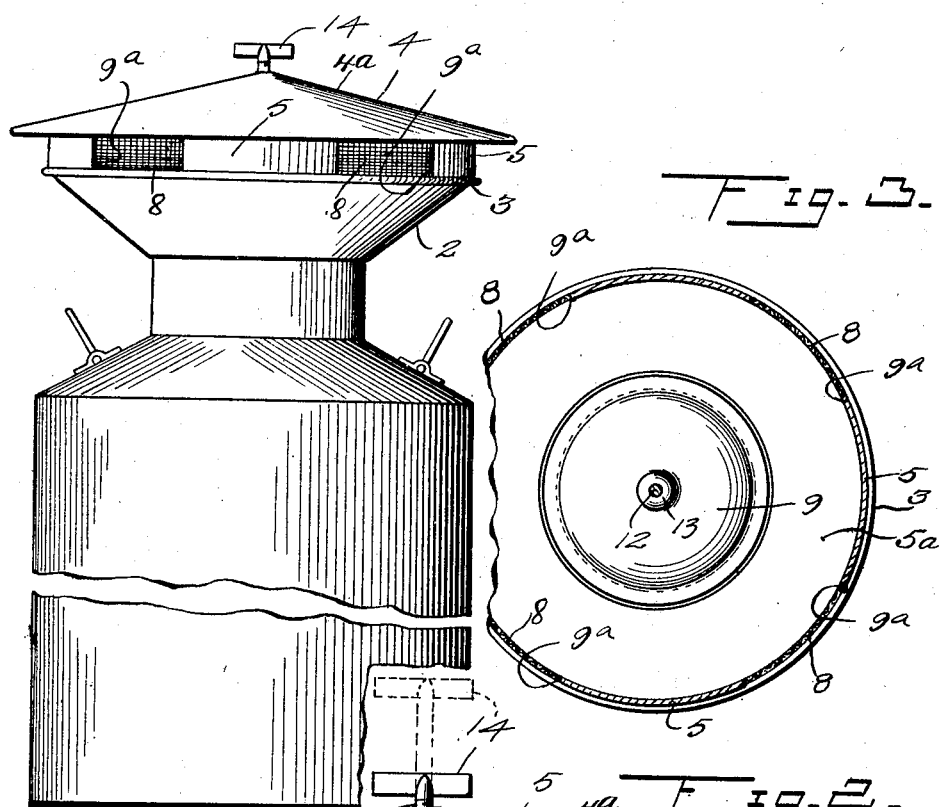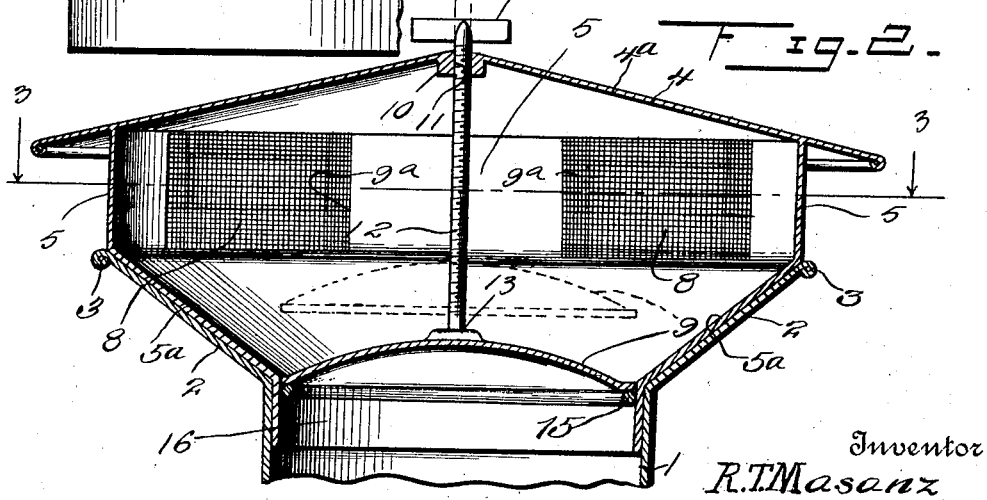

RAYMOND TIMOTHY MASANZ, OF EDGAR, WISCONSIN.

MILK-CAN COVER.

1,330,328.  Specification of Letters Patent.  Patented Feb. 10, 1920.

Application filed May 29, 1919. Serial No. 300,565.

*To all whom it may concern:*

Be it known that I, RAYMOND T. MASANZ, a citizen of the United States, residing at Edgar, in the county of Marathon and State of Wisconsin, have invented certain new and useful Improvements in Milk-Can Covers, of which the following is a specification, reference being had to the accompanying drawings.

This invention relates to a milk can cover, and an object of the invention is to provide a cover of this kind, which is designed for the purpose of keeping out the dust or dirt from the milk in the can, and having a closure proper adapted to be adjusted to permit of the escape of the heat from the can.

A further object of the invention is to provide a milk can cover which is simple, efficient, inexpensive and practical in construction, and also involves improved features of construction.

One of the features of construction is the provision of a milk can cover, which is hollow, and of a shape adapted to fit the conical flange of the milk can, and having a top portion which keeps out the dust and dirt, and also a cylindrical wall provided with screen covered openings, to permit of the escape of heat from the milk can, when the cover proper is open, there being means swivelly connected to the cover proper, whereby it may be adjusted to an open or closed position.

A further feature of the invention is the provision of a ring carried on the inner portion of a depending part of the hollow cover, with which the cover proper coöperates, to close the milk can.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of the milk can, showing the improved cover as applied thereto and constructed in accordance with the invention.

Fig. 2 is a sectional view through the upper portion of the can and the cover, showing the milk can closure proper raised in dotted lines.

Fig. 3 is a sectional view on line 3—3 of Fig. 2.

Referring more especially to the drawings, 1 designates the body of a milk can, which may be any suitable shape or configuration, preferably such as illustrated. The upper part of the body of the can is provided with a flaring conical shaped flange 2 having a head 3.

A cover designated as a whole by the numeral 4 is provided. This cover comprises a conical top $4^a$, having a depending cylindrical wall 5, which is provided with a downwardly and inwardly conical portion $5^a$, in fact, this portion or wall $5^a$ corresponds to and engages the conical flange 2 of the milk can, when the cover 4 is arranged in position. The portion $5^a$ has a cylindrical depending flange or extension 16. Adjacent where the flange 16 merges from the conical portion or wall $5^a$ a suitable ring 15 (which may be any suitable shape in cross-section) is secured, in any suitable manner as by means of brazing, soldering or the like. A cover proper 9 is mounted in the hollow cover 4, and the marginal portion of this cover 9 is designed to engage with the ring 15, thereby closing the milk can, that is when the cover 4 is placed in position. The top $4^a$ of the cover 4 is provided with a boss or enlargement 10, which has a threaded opening therethrough, as indicated at 11. A screw 12 is threaded through the opening 11, and has a swiveled connection, as at 13, with the cover 9, and the upper end of the screw has a hand piece or head 14, which may be gripped, for the purpose of turning the screw, for raising and lowering the cover 9. It is obvious that when the cover 9 is raised, that the heat from the milk can will ascend into the hollow cover 4, and escape through the openings $9^a$. These openings $9^a$ are covered with a wire fabric or screen or meshwork 8, which permits the escape of the heat from the milk can, and owing to the top $4^a$ of the cover 4 overlying the cylindrical wall 5 considerably, a great deal of the dust and foreign matter is prevented from passing through the fabric covered openings 9ª. In order to gain access to the milk in the milk can, the cover 4 may be removed. While the cover 4 is in position and the cover proper 9 is closed, the contents of the milk can are prevented from splashing upwardly on the interior of the hollow cover 4, that is during the transit of the milk can on the train.

The invention having been set forth, what is claimed as new and useful is:

1. The combination with a milk can body provided with an outwardly flared conical flange at its upper open end, of a hollow cover having a conical top and a depending cylindrical wall and an inwardly and downwardly conical portion extending from the cylindrical wall, engaging the conical flange of the milk can, the lower part of the conical portion of the cover having an interior bearing ring, a cover proper engaging said ring, and a screw threaded through the top of the first cover and having a swiveled connection with the cover proper, whereby it may be opened and closed, the cylindrical wall of the first cover having a plurality of fabric covered openings, to permit of the escape of heat from the milk can when the cover proper is open, and to prevent the intake of dust and dirt.

2. The combination with a milk can body having an outwardly flared conical flange at its upper open end, of a hollow cover having a portion corresponding to and engaging the flange of the milk can body, the wall of the cover having wire fabric covered openings to permit of the escape of the heat from the milk can, the interior of the cover having an annular bearing, a cover proper engaging said bearing, and means for opening and closing the cover proper, said means being carried by the top of the first cover.

In testimony whereof I hereunto affix my signature in the presence of two witnesses.

RAYMOND TIMOTHY MASANZ.

Witnesses:
WM. C. SEIM,
JOHN MASANZ, Sr.